United States Patent
Koschinat

(10) Patent No.: US 10,722,891 B2
(45) Date of Patent: Jul. 28, 2020

(54) STORAGE CONTAINER FOR LIQUIDS

(71) Applicant: EUROIMMUN MEDIZINISCHE LABORDIAGNOSTIKA AG, Lübeck (DE)

(72) Inventor: Lars Koschinat, Warnsdorf (DE)

(73) Assignee: EUROIMMUN MEDIZINISCHE LABORDIAGNOSTIKA AG, Lübeck (DE)

( * ) Notice: Subject to any disclaimer, the term of this patent is extended or adjusted under 35 U.S.C. 154(b) by 0 days.

(21) Appl. No.: 14/955,347

(22) Filed: Dec. 1, 2015

(65) Prior Publication Data
US 2016/0167848 A1    Jun. 16, 2016

(30) Foreign Application Priority Data

Dec. 15, 2014 (EP) ................................. 14004214
Aug. 31, 2015 (EP) ................................. 15002554

(51) Int. Cl.
*B01L 3/00* (2006.01)
*B65B 3/00* (2006.01)
(Continued)

(52) U.S. Cl.
CPC ............... *B01L 3/523* (2013.01); *B32B 3/02* (2013.01); *B32B 3/266* (2013.01); *B32B 7/06* (2013.01);
(Continued)

(58) Field of Classification Search
CPC ...... B01L 3/00; B01L 3/15; B01L 3/50; B01L 3/508; B01L 3/50825; B01L 3/5085;
(Continued)

(56) References Cited

U.S. PATENT DOCUMENTS 2,917,216 A    12/1959  Despres
3,605,374 A     9/1971  Mueller et al.
(Continued)

FOREIGN PATENT DOCUMENTS

EP   0650676 B1    1/2000
EP   1 310 303 A1  5/2003
(Continued)

OTHER PUBLICATIONS

Extended European Search Report, dated Apr. 26, 2016, for European Application No. 15 00 2554, 4 pages.
(Continued)

*Primary Examiner* — Jill A Warden
*Assistant Examiner* — Dwayne K Handy
(74) *Attorney, Agent, or Firm* — Seed Intellectual Property Law Group LLP

(57) ABSTRACT

The present invention relates to a storage container for liquids, comprising a liquid-tight tank with an upwardly directed opening, wherein the opening is closed in a leak-tight fashion by a protective film comprising an outer layer and an inner layer, wherein the outer layer is an aluminium foil and the inner layer is a plastic film, wherein the outer layer can be removed from the storage container separately from the inner layer, and wherein the inner layer can be pierced by a hollow needle;
an assembly comprising at least two storage containers according to the invention;
and a method for producing the assembly according to the invention, comprising the steps of providing at least two storage containers according to the invention, and applying a continuous layer of an adhesive film on the outer layers of the protective films of the at least two storage containers.

19 Claims, 4 Drawing Sheets

(51) Int. Cl.
 B65B 3/04 (2006.01)
 B32B 3/02 (2006.01)
 B32B 7/12 (2006.01)
 B32B 37/00 (2006.01)
 B32B 27/32 (2006.01)
 B32B 27/08 (2006.01)
 B32B 3/26 (2006.01)
 B32B 15/20 (2006.01)
 B32B 15/08 (2006.01)
 B32B 7/06 (2019.01)

(52) U.S. Cl.
 CPC ............... *B32B 7/12* (2013.01); *B32B 15/08* (2013.01); *B32B 15/20* (2013.01); *B32B 27/08* (2013.01); *B32B 27/32* (2013.01); *B32B 37/00* (2013.01); *B65B 3/003* (2013.01); *B65B 3/04* (2013.01); *B01L 3/527* (2013.01); *B01L 2200/028* (2013.01); *B01L 2300/044* (2013.01); *B01L 2300/0887* (2013.01); *B32B 2250/44* (2013.01); *B32B 2255/00* (2013.01); *B32B 2307/58* (2013.01); *B32B 2307/7244* (2013.01); *B32B 2307/7265* (2013.01); *B32B 2307/732* (2013.01); *B32B 2307/748* (2013.01); *B32B 2435/02* (2013.01)

(58) Field of Classification Search
 CPC ............. B01L 3/50853; B01L 2300/04; B01L 2300/044; B01L 3/523
 USPC ........ 422/547, 549, 550, 553, 568, 569, 570
 See application file for complete search history.

(56) References Cited

U.S. PATENT DOCUMENTS

| | | | |
|---|---|---|---|
| 3,951,313 A | 4/1976 | Coniglione | |
| 6,032,800 A | 3/2000 | Kocher | |
| 2003/0031598 A1* | 2/2003 | Stevens | B01L 3/5453 422/549 |
| 2003/0207463 A1* | 11/2003 | Iheme | B01L 3/0275 436/180 |
| 2005/0218143 A1 | 10/2005 | Niederer et al. | |
| 2013/0064739 A1* | 3/2013 | Koskinen | B01L 3/50825 422/554 |

FOREIGN PATENT DOCUMENTS

| | | |
|---|---|---|
| EP | 1 318 010 A1 | 6/2003 |
| EP | 1 619 130 A1 | 1/2006 |
| EP | 1 902 973 A1 | 3/2008 |
| EP | 1 918 094 A1 | 5/2008 |
| EP | 2 191 893 A1 | 6/2010 |
| EP | 2 327 636 A1 | 6/2011 |
| FR | 2 734 243 A1 | 11/1996 |
| GB | 2 353 986 A | 3/2001 |
| WO | 87/05533 A1 | 9/1987 |
| WO | 2012/028849 A1 | 3/2012 |
| WO | 2013/049706 A1 | 4/2013 |
| WO | 2014/080503 A1 | 5/2014 |

OTHER PUBLICATIONS

Office Action for corresponding European Application No. 15 002 554.2-1101, dated Sep. 29, 2019, with English translation, 5 pages.
Office Action for corresponding Chinese Application No. 201510919571.X, dated Aug. 8, 2019, with English translation, 19 pages.

\* cited by examiner

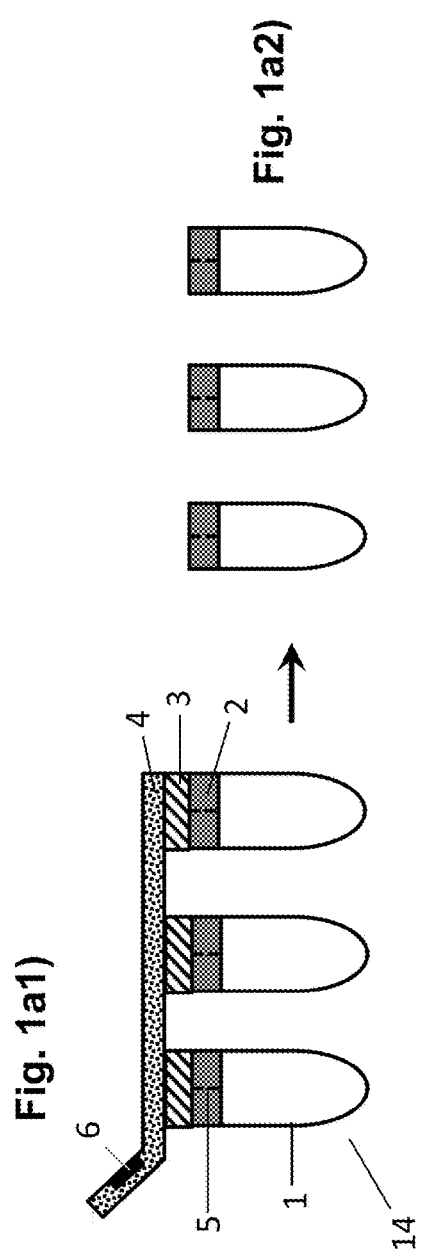
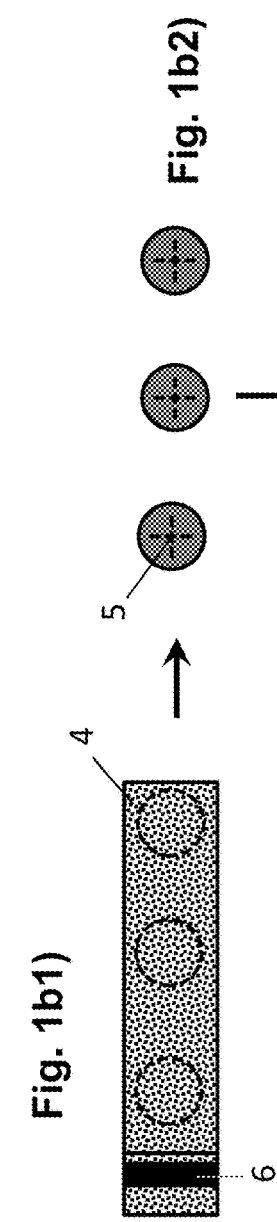
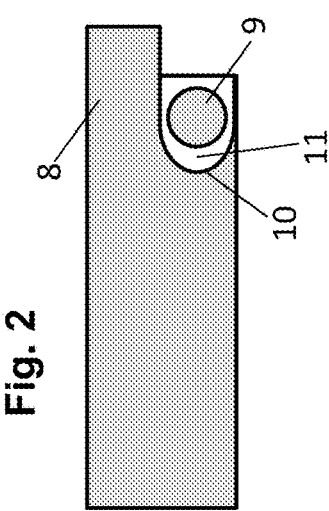

STORAGE CONTAINER FOR LIQUIDS

The present invention relates to a liquid-tight storage container having an opening, wherein the opening is closed by a protective film comprising an outer layer and an inner layer, wherein the outer layer is an aluminium foil and the inner layer is a plastic film, wherein the outer layer can be removed from the storage container separately from the inner layer, and wherein the inner layer can be pierced by a hollow needle;

an assembly comprising at least two storage containers according to the invention;

and a method for producing the assembly according to the invention, comprising the steps of providing at least two storage containers according to the invention, and applying a continuous layer of an adhesive film on the outer layers of the protective films of the at least two storage containers.

For a large number of technical methods in the fields of chemistry, biotechnology, pharmacy and medicine, it is necessary to use a plurality of liquid reagents which can be produced or filled in each case only with great outlay. It is expedient not to produce each of them freshly every time the method is carried out, but to prepare a stock of a quantity sufficient for several runs, which can then be stored in suitable portions until use.

Apart from economic and logistical advantages, specifically in the field of medicine, or more precisely laboratory diagnosis, this leads to a minimization of the error susceptibility of the overall system, as practically identical reagents can be used for each run of the desired diagnostic method. If a result is ambiguous, it is readily possible to check whether a test parameter was in fact decisive for the failure by repeating the test while varying only this test parameter, for example a reagent of questionable quality.

The need to have practically identical reagents, which have been produced beforehand in one pass, available for a plurality of runs of a method, entails the need to provide suitable storage containers in which the reagent of interest can be stored without loss of quality. It should be possible for the storage containers to be opened and reclosed repeatedly, so that the residue remaining after extraction of a part of the reagent stays protected and does not need to be discarded.

Often, it is furthermore necessary to transport the containers from the site of the reagent extraction, for example a pipetting machine, to a store, for example a cold room. For storage and transport, accidents which lead to loss of liquid should be prevented.

Not least, identity assurance is of particular importance not only for samples but also for reagents. Particularly for high-throughput methods in which a multiplicity of reagents are used in parallel, the chemical composition, the storage life and the source of each liquid must be identifiable in each step. Any manufacturer who implements stringent quality management must be able to track the origin of each batch with the aid of the identifier thereof at any time, without the information associated therewith, which often involves company confidentiality, being available to the end user.

A range of storage containers are described in the prior art. EP1310303 discloses a container for a plurality of different reagents required for carrying out a protocol, having a plurality of compartments separated from one another, which is characterized in that it is prefabricated in a defined format for carrying out a particular protocol and closed in a secure manner for transportation, and respectively contains the reagents required for the protocol in the amounts specified by the format. The container is configured in such a way that it can be processed automatically. EP1310303 furthermore discloses that the film has a sandwich structure comprising aluminium and plastic layers. However, EP1310303 does not mention either the arrangement according to the invention of the film layers and the removability of an outer aluminium layer separately from an inner plastic layer, or the intended piercing position according to the invention.

WO1987005533A1 and U.S. Pat. No. 3,951,313A disclose further storage containers for medically usable liquids.

The storage containers described in the prior art are distinguished in that, in the closed state, they are highly suitable for long-term storage, but after having been opened once and used in devices capable of pipetting, they have only a relatively short further storage life. The reason is, in particular, that this leads to the container no longer being sealed against liquid loss after opening. The liquid therein can evaporate, which in turn means that the concentration of the reagents contained therein changes.

Furthermore, germs can enter the vessel through the opening, particularly during transport outside closed devices, and multiply in the solution and contaminate it or influence the analytical results by undesired reactions.

Not least, when changing storage vessels, which is often necessary particularly for the case when only a small part of the liquid stored therein is consumed each time the storage container is used, the risk arises of mistakes and accidents which may lead to an unclosed storage container being tipped over and total loss of the liquid taking place. As analytical reagents are often sold as a kit in complete packs, the loss of a single container, even if it itself contains a favourable liquid, can have the effect that the entire kit has to be repurchased.

Besides overcoming the aforementioned disadvantages of the containers described in the prior art, it is explicitly an object of the present invention to provide a storage container for liquids which offers greater protection against loss of the liquid contained therein in an automated method, for example by evaporation, particularly when liquid is repeatedly extracted from the container.

It is furthermore an object of the invention to provide a storage container which can be adapted with little outlay to the respective situation, particularly during transport or during use, or storage between a plurality of uses, the adaptation allowing easier accessibility of the liquid during use without perturbing packaging layers, ideally together with optimized protection from liquid losses. On the other hand, during transport before this, the storage container should have a sufficient higher strength and/or printability which is no longer required subsequently during use.

It is furthermore an object of the present invention to provide an assembly having a plurality of storage containers, wherein the storage containers connected to one another in the assembly can be separated from one another as efficiently as possible and in one step, the data about the products in the respective assembly also being removable.

These and other objects are achieved by the subject-matter of the present application, and in particular also by the subject-matter of the appended independent claims; embodiments may be found in the dependent claims.

In a first aspect, the object of the invention is achieved by a liquid-tight storage container having an opening,
wherein the opening is closed by a protective film comprising an inner layer and an outer layer,
wherein the inner layer is a plastic film which can be pierced by a hollow needle and the outer layer is a layer, preferably an aluminium foil, which has a higher barrier leaktightness than the inner layer, and wherein the outer layer can be removed from the storage container separately from the inner layer.

In a first preferred embodiment, the inner layer has an intended piercing position.

In a second preferred embodiment, which also represents an embodiment of the other preferred embodiments, the intended piercing position is configured in the form of two weakened lines arranged in the shape of a cross in the inner layer.

In a third preferred embodiment, which also represents an embodiment of the other preferred embodiments, the inner layer, preferably the intended piercing position therein, is configured in such a way that after the piercing and subsequent removal of the hollow needle, an aqueous liquid contained in the storage container cannot emerge through the pierced inner layer when the storage container is inverted.

In a fourth preferred embodiment, which also represents an embodiment of the other preferred embodiments, the storage container furthermore comprises a peel-off adhesive film, which preferably extends beyond the periphery of the storage container, applied over the outer layer, the effect of peeling off the adhesive film being that the outer layer, but not the inner layer, of the protective film is removed from the storage container.

In a fifth preferred embodiment, which also represents an embodiment of the other preferred embodiments, the adhesive film has an identifier.

In a sixth preferred embodiment, which also represents an embodiment of the other preferred embodiments, the storage container comprises at least two compartments.

In a seventh preferred embodiment, which also represents an embodiment of the other preferred embodiments, the protective film covers one of the compartments.

In an eighth preferred embodiment, which also represents an embodiment of the other preferred embodiments, the compartment not covered by the protective film has a smaller storage container that is adapted to the shape of the compartment and covered with the same type of protective film.

In a ninth preferred embodiment, which also represents an embodiment of the other preferred embodiments, the storage container comprises a liquid, preferably a water-based liquid.

In a second aspect, the object of the invention is achieved by an assembly comprising at least two storage containers according to the invention, preferably connected by a fastening means.

In a first preferred embodiment of the second aspect, the storage containers have an adhesive film applied over the outer layer, the effect of peeling off the adhesive film being that the outer layer, but not the inner layer, of the protective films is removed from the storage containers, and the adhesive film being configured in the form of a continuous layer over the protective films of the storage containers, which can be peeled off from the assembly in one piece.

In a third aspect, the object of the invention is achieved by a method for producing the assembly according to the invention, comprising the steps of a) providing at least two storage containers according to the invention, and b) applying a continuous layer of an adhesive film on the outer layers of the protective films of the at least two storage containers.

In a fourth aspect, the object of the invention is achieved by a method comprising the steps of a) providing a storage container according to the invention, optionally in the form of an assembly according to the invention, the storage container containing a liquid, b) inserting a hollow needle into the storage container and extracting at least a part of the liquid contained in the storage container or a compartment thereof, c) transferring the liquid extracted from the storage container in step b) into a separate container, and d) removing the hollow needle from the storage container.

In a preferred embodiment, the method furthermore comprises the steps of e) repeating steps a) and b), the liquid being extracted from a different storage container or, if there is one, a different compartment of the storage container, f) transferring the liquid extracted in step e) into the separate container so as to come in contact with the liquids extracted in steps a) and b) or in step e).

The present invention relates to a liquid-tight storage container having one or more than one opening, preferably having an upwardly directed opening, which is suitable for storing medically relevant liquids. The storage container may consist of any material which has sufficient strength and mechanical stability and is chemically sufficiently inert in relation to the liquid contained therein. For example, glass and conventional plastics such as polyethylene may be envisaged. The opening and the shape are selected in such a way that a liquid is held inside by the effect of gravity even when the opening is not closed. The storage container may have the shape of a test tube or a commercially available plastic cup, preferably a shape tapering in the direction of the bottom. It may, however, also have a rectangular shape with two short walls and two long walls. Other geometrical configurations are, however, also possible, so long as the aforementioned requirements are satisfied, for example a vessel with a pentagonal, hexagonal or polygonal base surface or polygons in which one or more sides do not extend in a straight line between the vertices but represent a curve.

The protective film consists of an inner layer, facing towards the inside of the storage container, and an outer layer facing towards the surroundings. Further layers may additionally be present, so long as this does not interfere with the function of the outer and inner layers, in particular the pierceability of the inner layer. Such layers may be a sealing coating, further plastic layers or printing.

The outer layer has a higher barrier leaktightness than the inner layer. It preferably comprises an aluminium foil made of commercially available aluminium alloys or mixtures, preferably with a thickness of from 5 to 100 µm, more preferably from 8 to 40 µm thick. The inner layer comprises a plastic film, preferably with a thickness of from 1 to 30 µm, more preferably from 2 to 40 µm, most preferably from 4 to 8 µm. The entire protective film may be produced by applying the plastic film onto the aluminium foil, for example by means of lamination or coextrusion. A suitable system is described, for example, in EP 1 918 094. Instead of aluminium foil, other materials with a higher barrier leaktightness may also be selected, however, for example suitable plastic films. The barrier leaktightness is preferably quantified by means of the oxygen permeability, preferably measured according to DIN 53380 at 23° C. and with 0% relative humidity. Particularly preferably, the oxygen permeability of the outer layer is less than 0.5 $cm^3/m^2 \times d \times bar$. In a further preferred embodiment, the barrier leaktightness is quantified by means of the water vapour permeability, preferably measured according to DIN 53122 at 23° C. and with 85% relative humidity. Particularly preferably, the water vapour permeability of the outer layer is less than 0.5 $g/m^2 \times d$. In another preferred embodiment, the barrier leaktightness is quantified by means of the light transmissivity, precisely the optical density at 380 nm. In a particularly preferred embodiment, the barrier leaktightness is quantified by means of all the parameters of oxygen permeability, water vapour permeability and light transmissivity.

The protective film seals the opening before piercing, and preferably also thereafter, in such a way that the storage container is liquid-tight regardless of the position in which it is held.

What is essential is that the outer layer, which optionally is firmly connected to an adhesive film lying above, can be removed from the storage container separately from the inner layer. To this end, it is necessary for the outer layer to adhere to the inner layer less strongly than the inner layer adheres to the storage container according to the invention and/or that the outer layer can be separated with less force exertion than the inner from the storage container. Preferably, the inner layer is applied firmly on the edges of the opening, so that it cannot be separated from the storage container without tearing, whereas the aluminium layer is not connected directly to the storage container but only adheres to the plastic film of the inner layer via an easily removable bonding agent. Suitable bonding agents are described, for example, in EP 2 327 636. The separability is optionally assisted by the outer layer extending beyond the periphery of the storage container, for example in the form of a tab which can be gripped easily by hand.

It is furthermore essential that the inner layer can be pierced by a hollow needle, preferably slightly after, but not before the separation of the inner layer from the outer layer, which imparts increased strength to the protective film. Preferably, an inner layer is regarded as pierceable when it can be pierced with slight pressure exertion by hand with a hollow needle of the type 250 µl REF PN19477-002 from the company Agilent.

Preferably, the inner layer has an intended piercing position. In a preferred embodiment, the term "intended piercing position" as used here is intended to mean a position in the layer at which piercing with a hollow needle can be achieved with less force exertion, preferably because the layer is thinner at this position and/or predetermined tearing structures such as perforation lines are incorporated. The intended piercing position may be formed by weakened positions, which may for example be incorporated into the inner layer with a laser, preferably with a $CO_2$ laser, as described for example in EP 2 327 636. As an alternative, the intended piercing position may be formed by stamping, embossing, perforation or similar methods.

The shape of the intended piercing position is preferably selected in such a way that, after the piercing and subsequent removal of the hollow needle, an aqueous liquid cannot emerge through the pierced layer when the storage container is inverted. This may be achieved by the opening resulting from the piercing being kept sufficiently small and/or, preferably, the type and shape of the intended piercing position defining the opening such that no piece of the inner layer is lost during the piercing, but instead the piercing position is reclosed by the freely mobile film parts adhering to one another after the piercing. The surface tension of the water in the liquid and the adhesion forces of the ends of the film at the piercing position on the other hand lead to automatic closure after removal of the hollow needle. By selecting relevant parameters such as the layer thickness, the shape of the intended piercing position, the type of vessel and the volume of liquid, the person skilled in the art is capable of achieving a suitable embodiment which has this property. In particular, he will vary the dimensions and the intended piercing position in such a way that the opening resulting from the piercing is small enough, for example because of the length of the weakened lines, particularly when the intended piercing position results from at least two weakened lines arranged in the shape of a cross.

The shape of the intended piercing position is preferably to be selected in such a way as to allow automatic closure. Preferably, the intended piercing position is configured in the form of two weakened lines arranged in the shape of a cross in the inner layer. The piercing is then carried out particularly easily at the intersection of the two weakened lines.

Furthermore, the intended piercing position is preferably to be selected in such a way that the likelihood of inadvertently making a hole close to the intended piercing position in the inner layer when removing the outer layer is particularly small. This may be achieved by the intended piercing position either not having a point of intersection of weakened lines, or having only one point of intersection of weakened lines, from which at most three, preferably at most two weakened lines extend away from the direction of the centre of the intended piercing position. For example, intended piercing positions in the form of a "T" or a "Y" have three weakened lines which extend away from the point of intersection from the direction of the centre of the intended piercing position. For example, an intended piercing position in the form of a "V" or a "U" do not have a point of intersection of weakened lines.

Optionally, the storage container may have an adhesive film, preferably applied over the outer layer, the effect of peeling off this adhesive film being that the outer layer, but not the inner layer, of the protective film is removed from the storage container. Preferably, it extends beyond the periphery of the opening, preferably beyond the periphery of the storage container. This may be achieved by the outer layer being connected to the inner layer by an easily removable bonding agent, whereas the adhesive film is connected to the outer layer by a more strongly adhering bonding agent. In a preferred embodiment, the adhesive film is applied in a continuous layer onto the outer layer of the protective films of at least two of the storage containers, preferably all the storage containers, in an assembly according to the invention. In a particularly preferred embodiment, this means that an uninterrupted piece of the adhesive film connects the storage vessels by adhesion to their respective outer layers, preferably in addition to connection by a fastening means.

Preferably, the storage container contains a water-based liquid. This preferably means that the main solvent is water. The liquid may contain further substances, in particular buffers, salts and reagents required for a chemical or analytical reaction, particularly preferably ones which are suitable for a diagnostic test, for example ELISA, for example enzyme conjugate, chromogen or antibodies. It is, however, also possible to use solvents other than water, for example organic solvents.

Besides the liquid, the storage container optionally has a gas phase, which may consist of air. It is preferably a gas that is chemically more inert than air, which may be obtained by adding a chemically inert gas, for example nitrogen, carbon dioxide or a noble gas such as argon. The storage container is preferably filled with liquid to from 10 to 98, preferably from 15 to 90, more preferably from 25 to 75 per cent by volume.

Besides the liquid, the storage container may also contain solids, so long as these can be extracted through the inserted hollow needle and the liquid extracted through the latter. In a particularly preferred embodiment, the liquid contains beads which are coated with a chemical reagent, for example an antigen for detecting antibodies in a sample. The volume fraction of the solid, preferably the beads, in relation to the liquid is preferably from 5 to 80, more preferably from 7.5 to 60, and most preferably from 10 to 50 per cent by volume.

In order to protect photosensitive reagents, the storage container may also have a reduced light transmissivity, for example protection against light by a dark coating.

When the adhesive film is peeled off, the entire outer layer may be removed. Preferably, however, the outer layer has weakened lines and tears at these lines when the adhesive film is peeled off, so that a residue of the outer layer in a predetermined form remains. This residue may for example from an interrupted or, preferably, uninterrupted frame or ring around the centre of the opening, or the intended piercing position. The area in which the inner layer is split open during the piercing is then limited not only by the intended piercing position but also by the frame consisting of the remaining outer layer.

In a preferred embodiment, the storage container has two compartments. In a preferred embodiment, the term "compartment" as used here is intended to mean a liquid-tight chamber formed by a suitable partition inside the storage container. The partition is preferably a dividing wall, which extends up to the level of the opening of the storage container. Preferably, at least one compartment comprises a smaller separate storage container according to the invention adapted to its shape, the protective film of the latter preferably being connected not directly to the protective film of the aforementioned storage container, but particularly preferably indirectly by means of an adhesive film applied onto both containers. By introducing the liquid-filled and separately closed smaller storage container, it is possible to produce a storage container provided with two liquids, without entailing the risk of mixing during production or filling. Furthermore, various combinations of liquids can be formed flexibly.

At least two, preferably at least 3, 4, 6, 8, 12, 20, 50 or 100 storage containers may be combined to form an assembly. In a preferred embodiment, the term "assembly" as used here is intended to mean a group of storage containers connected firmly but preferably releasably to one another, the connection being achieved in the form of a fastening means and/or by the adhesive film. Plug-in connections of any type may be envisaged as fastening means. In the case of a rectangular storage container, two opposite walls, preferably the shorter opposing walls, preferably respectively have a plug-in element in the form of a male or female part protruding outwards. Preferably, a row of storage containers can thus be formed with one polarity from one end of the row to the other, which is defined by the plug-in connection. Optionally, the storage containers in the assembly remain connected to one another flexibly by the fastening means. Particularly when using a fastening means derived from a ball-and-socket connection, the storage containers may be configured in the form of a flexible chain. Particularly preferably, the storage containers in such an assembly are arranged in a row with the same orientation. In another preferred embodiment, the assembly has at least at one end a male or female part, not used for holding the assembly together, of a plug-in connection, and a handle that has a complementary female or male part for holding the assembly may be fitted onto this.

The storage container according to the invention may be used for a method in which a reaction or other detection method requires the liquid contained in the storage container to be brought together with a reaction partner. The transfer according to step c) may comprise contacting with a sample, for example a human sample, preferably a blood sample, or a substrate, agent or reagent, for example a fixed cell or fixed tissue. In a preferred embodiment, the liquid is a solution comprising an antibody, which is optionally associated with an enzyme, a fluorescent or chemiluminescent molecule, or a molecule that can be detected in another way. As an alternative, the liquid may be a sample or a control with a known composition, for example a positive control with a known concentration of an analyte to be detected.

In a particularly preferred embodiment, the method according to the invention is used in order to carry out an immunoassay, in particular selected from the group consisting of ELISA, chemiluminescence-based immunoassay or blot-based immunoassay, for example line blot or Western blot.

Such methods are preferably carried out in a laboratory machine which automatically forms the suitable reaction batches. Such a laboratory machine has suitable means for controlling the method, for pumping and pipetting liquid, for inserting the hollow needle, and a suitable separate container as a reaction space, in which the liquid from the storage container is used, for example for washing or for chemical reaction with a reaction partner. Suitable reaction spaces/methods are described in the prior art, for example in EP 2 191 893.

The invention will be explained below with reference to the figures with the aid of exemplary embodiments. The embodiments described are in every regard merely exemplary and are not to be regarded as restrictive, the scope of the invention including various combinations of the features mentioned.

BRIEF DESCRIPTION OF THE DRAWINGS

FIG. 1 shows an assembly (14) according to the invention with storage containers (1) which are closed by a protective film comprising an inner layer (2) and an outer layer (3). The assembly is additionally held together by an adhesive film (4) adhering to the outer layer. In the inner film, there is an intended piercing position in the form of a cross (5). An identifier (6) is applied on the adhesive film.

Whereas FIG. 1a1) shows the assembly in its full form in side view, the form obtained in FIG. 1a2) may be obtained by peeling off the adhesive film (4) and the outer layer (3) adhering thereon.

Figure 3:
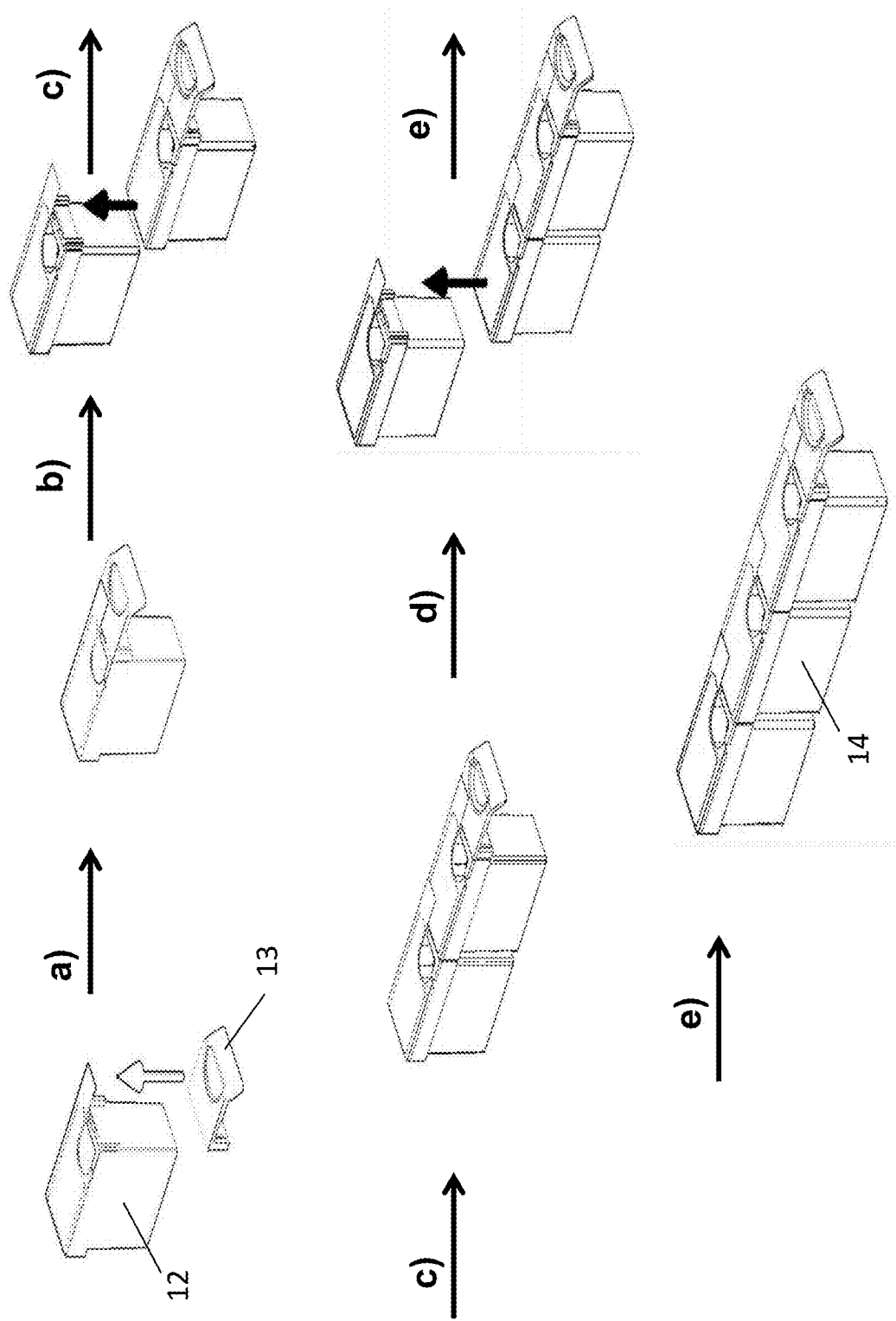

FIG. 1b1) and FIG. 1b2) respectively show from above the full form and the form obtained after peeling off the adhesive film. FIG. 1b3) shows the storage container of the assembly with a pierced intended piercing position (7).

FIG. 2 shows from above a storage container according to the invention having a first compartment (8) and a smaller second compartment (11), which are separated by a dividing wall (10). The smaller compartment contains a smaller storage container (9) according to the invention.

FIG. 3 shows the formation of an assembly according to the invention comprising a rectangular storage container (12) with two compartments by means of a plug-in connection. The first rectangular storage container has a handle (13), which is applied by means of the plug-in connection. An assembly of storage containers with a uniform orientation (14) is obtained.

Figure 4:
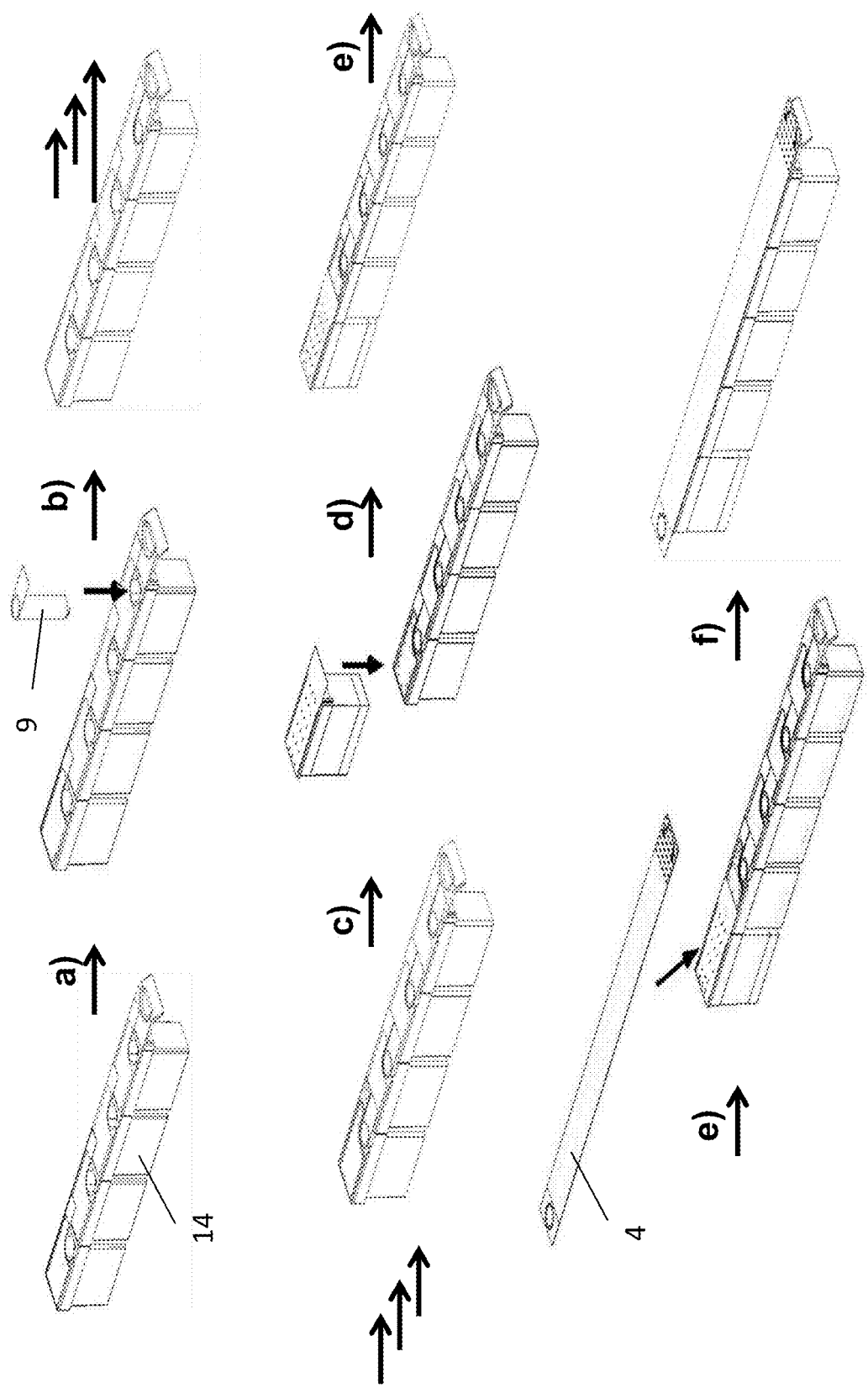

FIG. 4 illustrates the way in which smaller storage containers (9) are fitted into the smaller compartments of the storage containers joined to form an assembly (14) according to FIG. 3, followed by application of an adhesive film (4).

Figure 5:
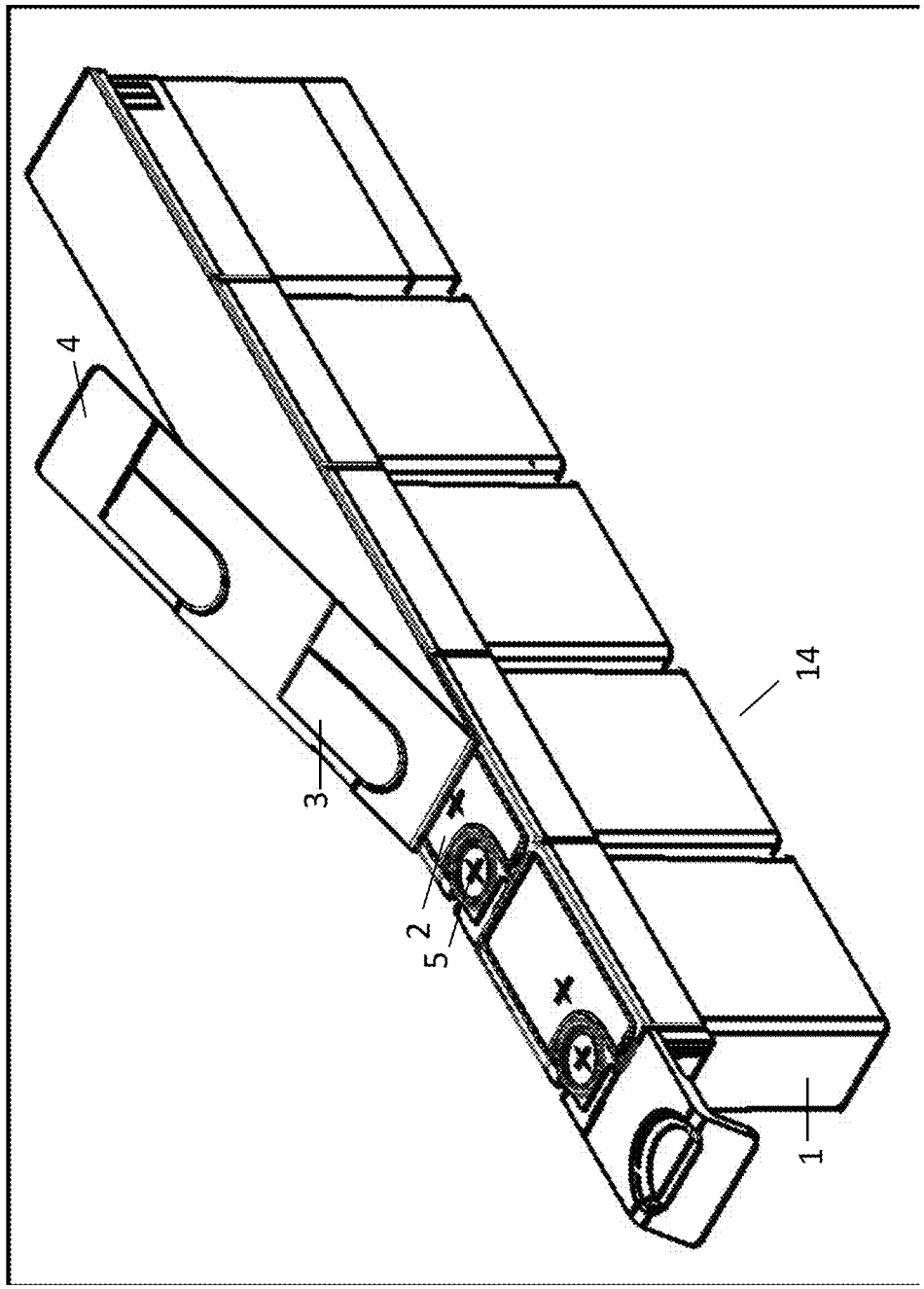

FIG. 5 shows in detail the assembly (14) according to the invention, represented in FIG. 4, obtained after step f), with storage containers (1) which are closed by a protective film comprising an inner layer (2) and an outer layer (3). The assembly is additionally held together by an adhesive film (4) adhering to the outer layer. In the inner film, there is an intended piercing position in the form of a cross (5).

LIST OF REFERENCES 1 storage container
2 inner layer
3 outer layer
4 adhesive film
5 intended piercing position
6 identifier
7 pierced intended piercing position
8 first compartment
9 smaller storage container
10 dividing wall
11 second compartment
12 rectangular storage container
13 handle
14 assembly The various embodiments described above can be combined to provide further embodiments. All of the U.S. patents, U.S. patent application publications, U.S. patent applications, foreign patents, foreign patent applications and non-patent publications listed in the Application Data Sheet are incorporated herein by reference, in their entirety.

The invention claimed is:

1. A liquid-tight storage container having an opening,
wherein the opening is closed by a protective film comprising an inner layer and an outer layer,
wherein the inner layer is a plastic film which can be pierced by a hollow needle and the outer layer is a layer which has a higher barrier leaktightness than the inner layer,
wherein the inner layer is coupled directly to the outer layer by a bonding agent, wherein a first bond between the outer layer and the inner layer is weaker than a second bond between the storage container and the inner layer such that the outer layer is configured to be removed without removing the inner layer,
wherein the inner layer is configured in such a way that after the piercing and subsequent removal of the hollow needle, an aqueous liquid contained in the storage container cannot emerge through the pierced inner layer when the storage container is inverted, and
wherein a peel-off adhesive film extends beyond a periphery of the storage container and over the outer layer, wherein the peel-off adhesive film is configured so that when the peel-off adhesive film is peeled off, the outer layer, but not the inner layer, is removed from the storage container.

2. The storage container according to claim 1, wherein the inner layer has an intended piercing position.

3. The storage container according to claim 2, wherein the intended piercing position is configured in the form of two weakened lines arranged in the shape of a cross in the inner layer.

4. The storage container according to claim 1, wherein the adhesive film has an identifier.

5. The storage container according to claim 1, wherein the storage container comprises at least two compartments.

6. The storage container according to claim 5, wherein the protective film covers one of the compartments.

7. The storage container according to claim 6, wherein a compartment not covered by the protective film has a smaller storage container that is adapted to the shape of the compartment and covered with a protective film comprising an inner layer and an outer layer, wherein the inner layer is a plastic film that can be pierced by a hollow needle, the outer layer is a layer has a higher leak tightness than the inner layer, and the outer layer can be removed from the smaller storage container separately from the inner layer.

8. The storage container according to claim 1, comprising a liquid.

9. An assembly comprising at least two storage containers according to claim 1, wherein the two storage containers are connected together by the peel-off adhesive film.

10. The assembly according to claim 9, wherein the peel-off adhesive film is a single continuous layer which can be peeled off from the assembly in one piece.

11. A method for producing an assembly, comprising the steps of:
a) providing at least two storage containers according to claim 1, and
b) wherein the adhesive film is formed by applying a continuous layer of the adhesive film on the outer layers of the protective films of the at least two storage containers.

12. A method, comprising the steps of:
a) providing a storage container according to claim 1, the storage container containing a liquid,
b) peeling off the adhesive film and thereby removing the outer layer from the storage container,
c) inserting a hollow needle through the inner layer into the storage container after removing the outer layer from the storage container, and extracting at least a part of the liquid contained in the storage container or a compartment thereof,
d) transferring the liquid extracted from the storage container in step c) into a separate container, and
e) removing the hollow needle from the storage container.

13. The method according to claim 12, further comprising the steps of:
f) repeating steps a), b), and c), the liquid being extracted from a different storage container or, if there is one, a different compartment of the storage container, and
g) transferring the liquid extracted in step f) into the separate container so as to come in contact with the liquids extracted in steps a), b), and c) or in step f).

14. A method, comprising the steps of:
a) providing a storage container in the form of an assembly according to claim 9, the storage container containing a liquid,
b) peeling off the adhesive film and thereby removing the outer layer from the storage container,
c) inserting a hollow needle through the inner layer into the storage container after removing the outer layer from the storage container, and extracting at least a part of the liquid contained in the storage container or a compartment thereof, d) transferring the liquid extracted from the storage container in step c) into a separate container, and e) removing the hollow needle from the storage container.

15. The storage container according to claim 1, wherein the outer layer is an aluminium foil.

16. The storage container according to claim 2, wherein the intended piercing position is configured in such a way that after the piercing and subsequent removal of the hollow needle, an aqueous liquid contained in the storage container cannot emerge through the pierced inner layer when the storage container is inverted.

17. The storage container according to claim 8, wherein the liquid is a water-based liquid.

18. An assembly comprising:

a plurality of liquid-tight storage containers, each of the plurality of liquid-tight storage containers having an opening, wherein each of the openings is closed by a protective film comprising an inner layer and an outer layer, wherein the inner layer is a plastic film which can be pierced by a hollow needle and the outer layer is a layer which has a higher barrier leaktightness than the inner layer, wherein the inner layer is coupled directly to the outer layer by a bonding agent, wherein a first bond between the outer layer and the inner layer is weaker than a second bond between the storage container and the inner layer such that the outer layer is configured to be removed without removing the inner layer, and wherein the inner layer is configured in such a way that after the piercing and subsequent removal of the hollow needle, an aqueous liquid contained in the storage container cannot emerge through the pierced inner layer when the storage container is inverted, and a peel-off adhesive film coupled to the outer layer of each of the plurality of liquid-tight storage containers, wherein the peel-off adhesive film is configured so that when the peel-off adhesive film is peeled off, the outer layer, but not the inner layer, of the protective film is removed from the storage container.

19. The assembly according to claim 18, wherein the outer layer of each of the plurality of liquid-tight storage containers are coupled to the peel-off adhesive film such that adjacent liquid-tight storage containers are spaced from each other and the peel-off adhesive film extends therebetween.

* * * * *